(12) United States Patent
Wu et al.

(10) Patent No.: US 7,679,905 B2
(45) Date of Patent: Mar. 16, 2010

(54) PRESSING-TYPE PAD STRUCTURE AND ELECTRONIC DEVICE USING THE SAME

(75) Inventors: Chien-Hsum Wu, Taipei (TW); Mei-Hui Liu, Taipei (TW); Shu-Mei Lee, Taipei (TW); Chien-Chun Chiu, Taipei (TW); Fang-Yi Chen, Taipei (TW); Dah-Jong Shyu, Taipei (TW)

(73) Assignee: Inventec Corporation, Taipei (TW)

( * ) Notice: Subject to any disclaimer, the term of this patent is extended or adjusted under 35 U.S.C. 154(b) by 372 days.

(21) Appl. No.: 11/845,814

(22) Filed: Aug. 28, 2007

(65) Prior Publication Data

US 2008/0283711 A1 Nov. 20, 2008

(30) Foreign Application Priority Data

May 16, 2007 (TW) .............................. 96117481 A

(51) Int. Cl.
*G06F 1/16* (2006.01)
(52) U.S. Cl. ................. 361/679.59; 248/500; 248/372.1
(58) Field of Classification Search ............ 361/679.59, 361/679.55, 801; 248/500, 372.1
See application file for complete search history.

(56) References Cited

U.S. PATENT DOCUMENTS

| | | | | |
|---|---|---|---|---|
| 4,693,444 A * | 9/1987 | Williams et al. | ............. | 248/653 |
| 4,951,241 A * | 8/1990 | Hosoi et al. | ............. | 361/679.09 |
| 5,175,671 A * | 12/1992 | Sasaki | .................... | 361/679.43 |
| 5,297,003 A * | 3/1994 | Nomura et al. | ........ | 361/679.12 |
| 5,375,076 A * | 12/1994 | Goodrich et al. | ........ | 361/679.17 |
| 5,469,327 A * | 11/1995 | Cheng | .................... | 361/679.55 |
| 5,688,030 A * | 11/1997 | McAnally et al. | ........ | 312/223.2 |
| 5,818,690 A * | 10/1998 | Spencer | .................. | 361/679.09 |
| 5,887,962 A * | 3/1999 | Tsai | ........................ | 312/351.9 |
| 6,002,581 A * | 12/1999 | Lindsey | .................. | 361/679.55 |
| 6,053,589 A * | 4/2000 | Lin | ............................ | 312/271 |
| 6,097,592 A * | 8/2000 | Seo et al. | ............... | 361/679.55 |
| 6,115,249 A * | 9/2000 | Cipolla et al. | .......... | 361/679.46 |
| 6,654,237 B1 * | 11/2003 | Lee | ........................ | 361/679.55 |
| 6,744,629 B2 * | 6/2004 | Hidesawa | .............. | 361/679.48 |
| 6,842,337 B2 * | 1/2005 | Helot et al. | ............. | 361/679.59 |
| 7,206,198 B2 * | 4/2007 | Wang | .................... | 361/679.55 |
| 7,286,369 B2 * | 10/2007 | Yaor | .......................... | 361/801 |
| 7,328,880 B2 * | 2/2008 | Helot et al. | ............. | 248/346.01 |
| 2006/0262498 A1* | 11/2006 | Banko | ........................ | 361/683 |
| 2007/0103859 A1* | 5/2007 | Yu | ............................... | 361/683 |

* cited by examiner

*Primary Examiner*—Lisa Lea-Edmonds
(74) *Attorney, Agent, or Firm*—Thomas, Kayden, Horstemeyer & Risley

(57) ABSTRACT

A pressing-type pad structure and an electronic device using the same are provided. The pressing-type pad structure includes a pad component, an elastic element and a positioning element. The rotatable pad component is disposed on a housing of the electronic device and has at least two concave portions. The elastic element connects the housing and the pad component. The positioning element is elastically disposed on the housing. One end of the positioning element is leant against the pad component. When the electronic device is pressed or moved, an elastic force of the elastic element is applied to the pad component to drive the pad component to rotate. The positioning element is selectively inserted into one of the concave portions for fixing the pad component, so as to change the position of the electronic device.

16 Claims, 3 Drawing Sheets

PRESSING-TYPE PAD STRUCTURE AND ELECTRONIC DEVICE USING THE SAME

This application claims the benefit of Taiwan application Serial No. 96117481, filed May 16, 2007, the subject matter of which is incorporated herein by reference.

BACKGROUND OF THE INVENTION

1. Field of the Invention

The invention relates in general to a pad structure and an electronic device using the same, and more particularly to a pressing-type pad structure and an electronic device using the same.

2. Description of the Related Art

The laptop technology has grown mature nowadays. Because the laptop computer has the advantages including lightweight and compact size, it is very easy for a user to take along the laptop computer, such that the laptop computer gradually replaces desktop computer. The laptop computer is usually put on the desk and the cover having a display of the laptop computer is lift while being used by the user. Therefore, the fixing method of the laptop computer is very important. In order to enable the laptop computer to dissipate heat normally when operating, the laptop computer is usually lifted up partially above the desk to avoid contacting the desk completely.

A rubber pad is usually placed under the housing of the laptop computer for prevent the laptop computer from sliding. Also, the laptop computer is lifted up at a proper distance to help dissipating heat. However, most of the rubber pads do not allow the user to adjust the distance between the laptop computer and the desk. Even when some of the pads have adjustable legs for adjusting the distance, the user has to flip the laptop computer and adjust the distance manually, which is the same as the method that the user uses to adjust the legs of the keyboard. Only fixed angles are used in some present pads that provide the user to adjust the lifting distance. Therefore, it is not very convenient to use such pads.

SUMMARY OF THE INVENTION

The invention is directed to a pressing-type pad structure and an electronic device using the same. A rotatable pad component works with an elastic element for providing a user with multistage height adjustment. The user only needs to press the electronic device, and then the pad component rotates for changing the height of the electronic device.

According to the present invention, a pressing-type pad structure for being disposed in an electronic device is provided. The pressing-type pad structure includes a pad component, an elastic element and a positioning element. The rotatable pad component is disposed on a housing of the electronic device and has at least two concave portions. The elastic element connects the housing and the pad component. The positioning element is elastically disposed on the housing. One end of the positioning element is leant against the pad component. When the electronic device is pressed or moved, an elastic force of the elastic element is applied to the pad component and drives the pad component to rotate. The positioning element is then selectively inserted in one of the concave portions for fixing the pad component so as to change the position of the electronic device.

According to the present invention, an electronic device including a housing and at least two pressing-type pad structures is provided. The pressing-type pad structures are disposed on the bottom of the housing. Each pad structure includes a pad component, an elastic element and a positioning element. The rotatable pad component is disposed on the housing and has at least two concave portions. The elastic element connects the housing and the pad component. The positioning element is elastically disposed on the housing. One end of the positioning element is leant against the pad component. When the housing of the electronic device is pressed or moved, an elastic force of the elastic element is applied to the pad component and drives the pad component to rotate. The positioning element is then selectively inserted in one of the concave portions for fixing the pad component, so as to change the position of the electronic device.

The invention will become apparent from the following detailed description of the preferred but non-limiting embodiments. The following description is made with reference to the accompanying drawings.

DETAILED DESCRIPTION OF THE INVENTION

Figure 1:
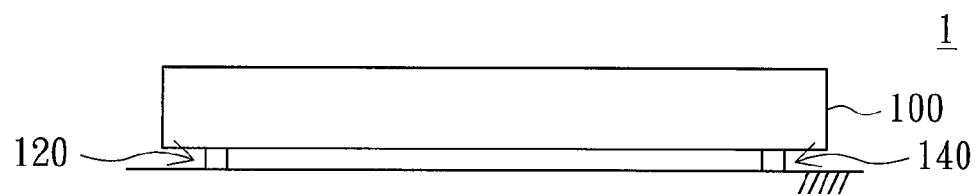
FIG. 1 illustrates an electronic device according to a preferred embodiment of the present invention.
Figure 2A:
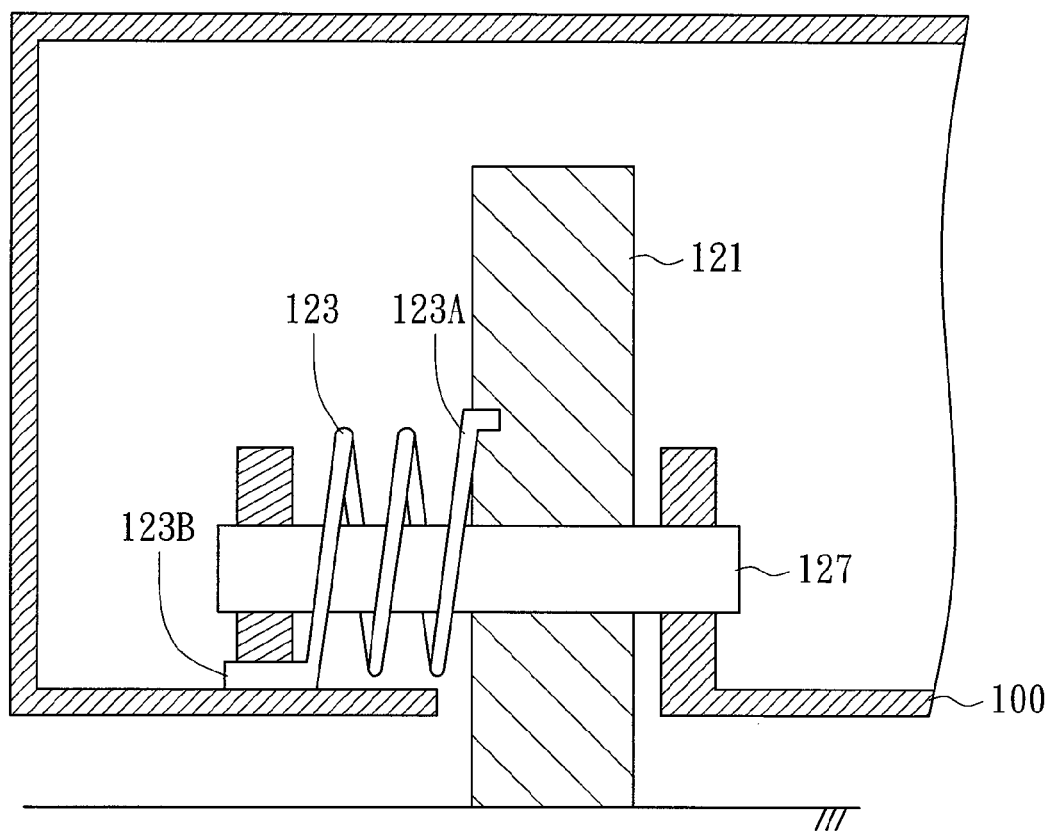
FIG. 2A is a cross-sectional view of a pressing-type pad structure in FIG. 1.
Figure 2B:
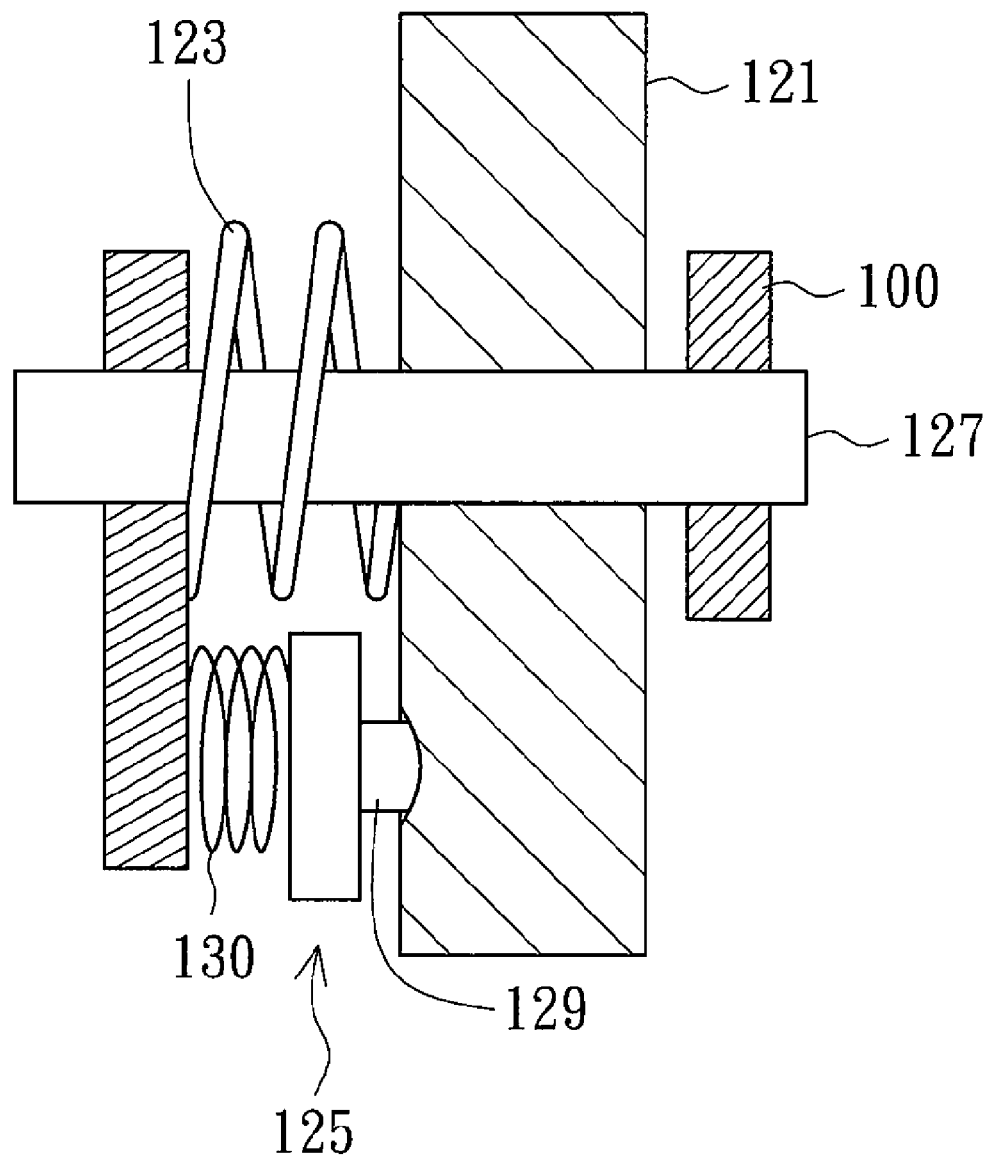
FIG. 2B is a top view of the pressing-type pad structure in FIG. 2A.

Please refer to FIG. 1 and FIGS. 2A~2B. FIG. 1 illustrates an electronic device according to a preferred embodiment of the present invention. FIG. 2A is a cross-sectional view of a pressing-type pad structure in FIG. 1. FIG. 2B is a top view of the pressing-type pad structure in FIG. 2A. As shown in FIG. 1, the electronic device 1 includes a housing 100 and two pressing-type pad structures 120 and 140 disposed on the bottom of the housing 100. The pressing-type pad structure 120 and 140 have the same structure. Only the pressing-type pad structure 120 is described as an example. As shown in FIGS. 2A~2B, the pressing-type pad structure 120 includes a pad component 121, an elastic element 123 and a positioning element 125. The rotatable pad component 121 is disposed on the housing 100 and has at least two concave portions. The elastic element 123 connects the housing 100 and the rotatable pad component 121. The positioning element 125 is elastically disposed on the housing 100. One end of the positioning element 125 is leant against the pad component 121. When the housing 100 of the electronic device 1 is pressed or moved, the elastic element 123 applies an elastic force to the pad component 121 for driving the pad component 121 to rotate. Then, the positioning element 125 is selectively inserted into one of the concave portions for fixing the pas component 121. As a result, the position of the electronic device 1 can be changed.

For example, the elastic element 123 of the pressing-type pad structure 120 is a torsion spring surrounding an axle 127 of the pad component 121. Two ends 123A and 123B of the torsion spring are connected with the pad component 121 and the housing 100, respectively. Preferably, the elastic element 123 applies a predetermined elastic force to the pad component 121. The elastic force of the elastic element 123 in the present embodiment is applied to the pad component 121 counterclockwise, for example. The positioning element 125 includes a positioning pin 129. The positioning pin 129 is connected to the housing 100 through another elastic element 130. This elastic element 130 is preferably a common compression spring for providing an elastic force to the positioning pin 129, such that the positioning pin 129 is leant against the pad component 121.

Figure 3A:
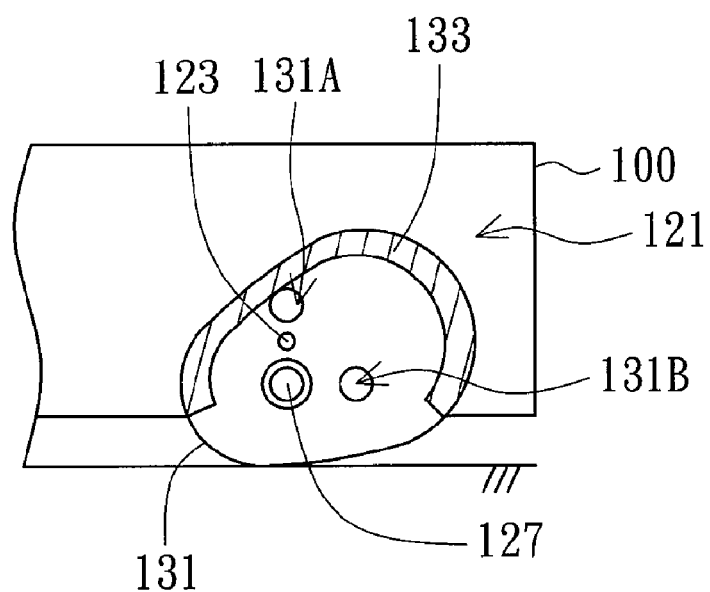
FIGS. 3A~3B are side views of the pressing-type pad structure in FIG. 2A before and after a pad component rotates.
Figure 3B:
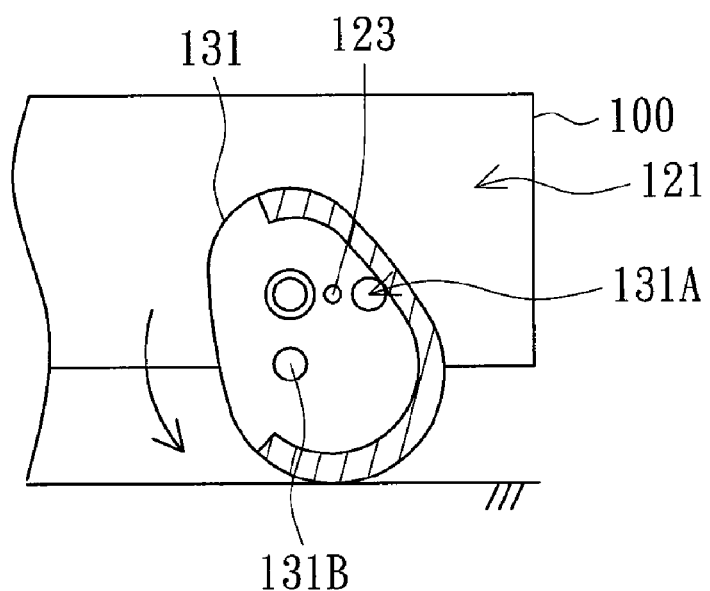

As to the structure of the pad component 121, please refer to FIGS. 3A~3B. FIGS. 3A~3B are side views of the pressing-type pad structure before and after the pad component rotates. As shown in FIG. 3A, the pad component 121 includes a cam 131 and a soft pad 133. When the pad component 121 rotates, the cam 131 enables the housing 100 to move upward and downward. The cam 131 changes the distance between the axle 127 of the pad component 121 and the carrying plane of the electronic device 1 for changing the height of the electronic device 1. The concave portions of the pad component 121 are located on the cam 131. For example, the concave portions are positioning holes 131A and 131B. The distances from the two positioning holes to the axle 127 are the same. Also, a proper distance is between the positioning holes 131A and 131B. After the pad component 121 rotates a certain angle, the positioning pin 129 (shown in FIG. 2B) is inserted in the positioning hole 131A or 131B. The soft pad 133 covers the edge of the cam 131 for contacting the carrying surface of the electronic device 1. Therefore, enough friction provided by the soft pad 133 is capable of preventing the electronic device 1 from sliding. Preferably, the material of the soft pad 133 includes rubber, which is slide-proof and easy to obtain.

When the electronic device 1 is on the original position, the positioning pin 129 is inserted in the positioning hole 131B for fixing the pad component 121, as shown in FIG. 3A. When the user wants to lift the electronic device 1, the user just needs to lightly press the housing 100 and then lift the housing 100 a little bit. When the housing 100 is pressed, the positioning pin 129 slides out of the positioning hole 131B. When the positioning pin 129 slides out of the positioning hole 131B, the pad component 121 is no longer restricted by the positioning pin 129. As the elastic element 123 applies the elastic force to the pad component 121 continuously, the pad component 121 will rotate counterclockwise. As shown in FIG. 3B, when the pad component 121 counterclockwise rotates a specific angle, the positioning pin 129 is inserted into the positioning hole 131A. As a result, the electronic device 1 is lifted.

When the user wants to adjust the electronic device to the original height (the state in FIG. 3A), the user only needs to press the housing 100 for applying a force to overcome the elastic force of the elastic element 123 (torsion spring) and the friction between the positioning pin 129 and the pad component 121. As a result, the pad component 121 rotates counterclockwise. When the positioning pin 129 is inserted into the positioning hole 131B, the pad component 121 is fixed. Then, the electronic device 1 is adjusted back to the original position.

Although the elastic force of the elastic element 123 is applied to the pad component 121 counterclockwise as an example, the present invention is not limited thereto. The elastic force of the elastic element 123 can be applied to the pad component 121 clockwise. Also, the structure of the pad component 121 can be modified according to the elastic element 23 to adjust the height of the electronic device 1.

Although two pressing-type pad structures 120 and 140 are disposed on the bottom of the housing 100 as an example, more than two pressing-type pad structures can be used. For example, four pressing-type pad structures can be disposed on the four corners of the bottom of the housing 100 of the electronic device 1. Therefore, the electronic device 1 is supported stably. The user can lift the entire electronic device 1 instead of only one side of the electronic device 1.

Furthermore, only two positioning holes are formed on the pad component in the present embodiment for providing two-stage adjustment. However, more positioning holes can be formed on the pad component. Through the proper arrangement of the positioning holes and the shape design of the cam, the pressing-type pad structure in the present embodiment is able to provide multistage height adjustment.

The electronic device 1 of the present embodiment is a laptop computer or an ultra-mobile personal computer for example. The pressing-type pad structure in the present embodiment provides multistage height adjustment according to the demand of the user. Moreover, through the combination of the rotatable pad component, the elastic element and the positioning pin, the user does not need to flip the electronic device over to adjust the height of the electronic device anymore.

In the pressing-type pad structure and the electronic device using the same, the rotatable pad component, the elastic element and the positioning pin are used so that the user only needs to press or move the electronic device to adjust the height of the electronic device. With several concave portions that are formed on the pad component, the pad structure is able to provide the user with multistage height adjustment of the electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pressing-type pad structure for being disposed on a housing of an electronic device, the pressing-type structure comprising:
   a rotatable pad component disposed on the housing and having at least two concave portions;
   an elastic element connecting the housing and the pad component; and
   a positioning element elastically disposed on the housing, one end of the positioning element leant against the pad component;
   wherein an elastic force of the elastic element is applied to the pad component and drives the pad component to rotate when the electronic device is pressed or moved, the positioning element is selectively inserted in one of the two concave portions for fixing the pad component so as to change the position of the electronic device.

2. The pad structure according to claim 1, wherein the pad component comprises a cam.

3. The pad structure according to claim 2, wherein the pad component further comprises a soft pad covering the cam.

4. The pad structure according to claim 1, wherein the distances from the concave portions to an axle of the pad component are substantially the same.

5. The pad structure according to claim 1, wherein the two concave portions are two positioning holes.

6. The pad structure according to claim 1, wherein the positioning element comprises a positioning pin and another elastic element connected with the positioning pin and disposed on the housing, the positioning pin is able to be inserted into one of the concave portions of the pad component for fixing the pad component.

7. The pad structure according to claim 1, wherein the elastic element is a torsion spring, one end of the torsion spring is connected with the housing, and the other end of the torsion spring is connected with pad component.

8. The pad structure according to claim 7, wherein the pad component comprises an axle for connecting with the housing, the torsion spring surrounds the axle.

9. An electronic device comprising:
- a housing; and
- at least two pressing-type pad structures disposed on the bottom of the housing, each pressing-type pad structure comprising:
  - a rotatable pad component disposed on the housing and having at least two concave portions;
  - an elastic element connecting the housing and the pad component; and
  - a positioning element elastically disposed on the housing, one end of the positioning element leant against the pad component;
- wherein an elastic force of the elastic element is applied to the pad component and drives the pad component to rotate when the housing is pressed or moved, the positioning element selectively inserted into one of the concave portions for fixing the pad component so as to change the position of the housing.

10. The electronic device according to claim 9, wherein the pad component comprises a cam.

11. The electronic device according to claim 10, wherein the pad component further comprises a soft pad covering the cam.

12. The electronic device according to claim 9, wherein the distances from the concave portions to an axle of the pad component are substantially the same.

13. The electronic device according to claim 9, wherein the concave portions are positioning holes.

14. The electronic device according to claim 9, wherein the positioning element comprises a positioning pin and another elastic element connected with the positioning pin and disposed on the housing, the positioning pin able to be inserted into one of the concave portions for fixing the pad component.

15. The electronic device according to claim 9, wherein the elastic element is a torsion spring, one end of the torsion spring is connected with the housing, and the other end of the torsion spring is connected with the pad component.

16. The electronic device according to claim 15, wherein the pad component comprises an axle for connecting with the housing, the torsion spring surrounds the axle.

* * * * *